June 14, 1960
C. DOTT
APPARATUS FOR SPRINKLING BAND-LIKE WEBS OR FOILS, MORE PARTICULARLY ROOFING FELTS
Filed April 23, 1957
2,940,422
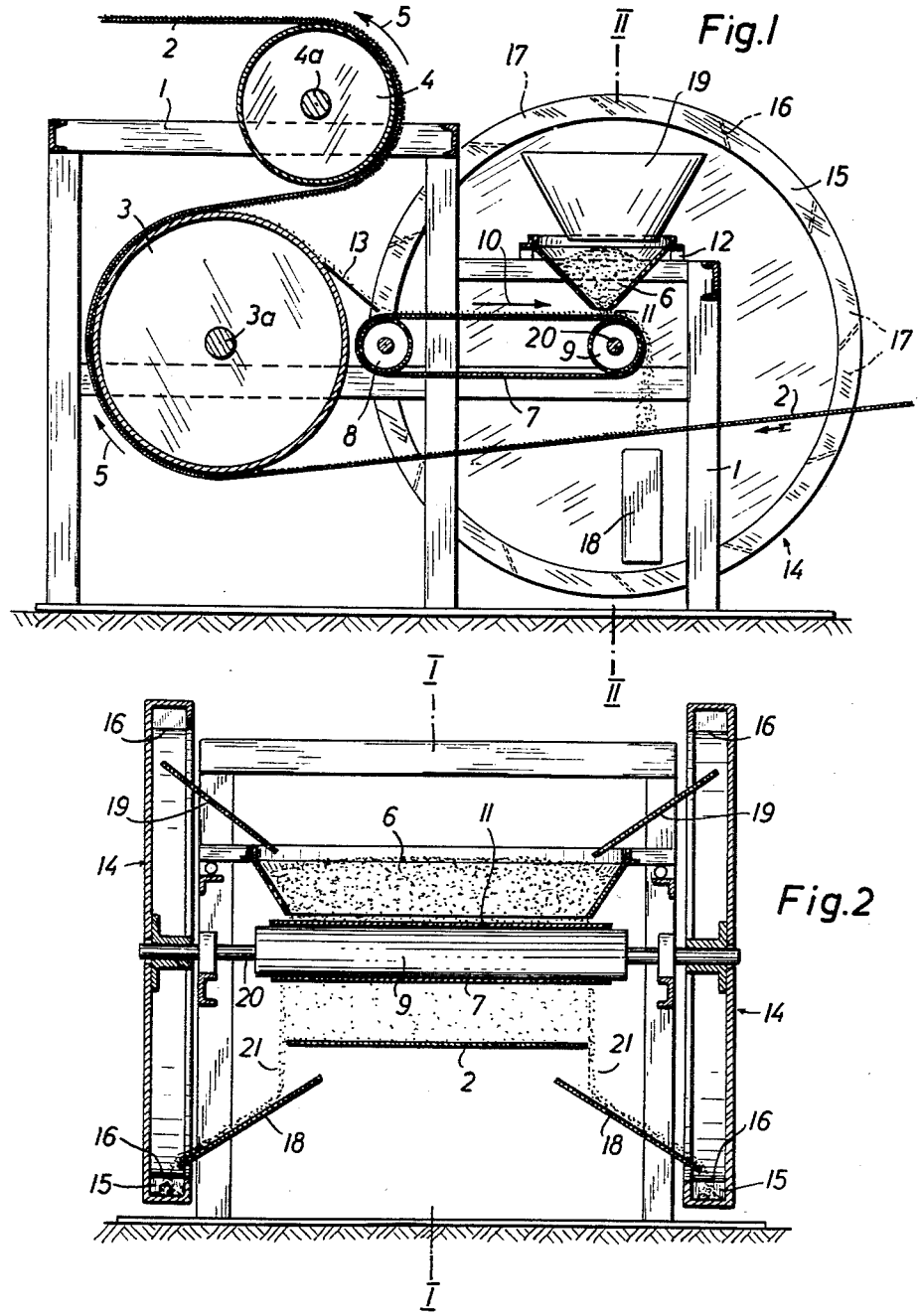
INVENTOR.
Caspar Dott

United States Patent Office 2,940,422
Patented June 14, 1960

2,940,422

APPARATUS FOR SPRINKLING BAND-LIKE WEBS OR FOILS, MORE PARTICULARLY ROOFING FELTS

Caspar Dott, Am Springborn 4, Koln-Mulheim, Germany

Filed Apr. 23, 1957, Ser. No. 654,570

Claims priority, application Germany June 22, 1956

6 Claims. (Cl. 118—312)

This invention relates to a process and an apparatus for sprinkling material of a granular or pulverulent quality onto band-like webs or foils made of any desired material, e.g. paper, pasteboard, woven and spun fabrics, metal, synthetic plastic material, more particularly for the manufacture of roofing felts, insulating pasteboard, webs of proofing material, insulating mats and the like.

For sprinkling a granular or pulverulent substance onto webs of material, more particularly roofing felts, it is known to arrange for the sprinkling material to drop directly onto the web from a sprinkling material container arranged above the web, and it is possible to regulate the quantity of material sprinkled by a gate situated at the outlet end of the container. Since the quantity of material sprinkled on must always be greater than the quantity which can be held in a securely adhering manner by the web, which is provided with a cement, and since the non-adhering sprinkled material has to be removed again from the web, it has already been proposed to change the direction of travel of the web by approximately 180° about a rotating cylinder, so that the surplus sprinkled material can fall off or be beaten off. This surplus is either lost or else it is collected in containers or the like. From this point it is returned to the sprinkling material container by way of intricate and expensive apparatus.

This invention relates to a further development and improvement of the known process and apparatus. It is characterized in that the surplus sprinkled material which has not come to adhere fast to the web is taken over by the conveyor device which feeds the sprinking material onto the web, and can travel from the said conveyor device directly back to the web. According to the invention any sprinkled material which falls down unused at the sides of the web is also collected and likewise returned to the conveyor device.

The conveyor device used is preferably an endless conveyor belt one end of which is situated in the region wherein the surplus sprinkled material falls off the upwardly deflected web, and whose other end is located below the outlet aperture of the sprinkling material container. The sprinkling material container expediently opens into a horizontal outlet slot bounded by straight sides, and the spacing of the outlet slot from the conveyor belt can be adjusted in order to regulate quantity of material issuing from the container.

With this process and arrangement there is no need for any further power-consuming device for transporting back the surplus sprinkled material, resulting in wear and tear, nor is there any need for special supervision of the sprinkling apparatus; for if there is any interruption in work or if the whole sprinkling apparatus stops, the sprinking material after spreading out to its natural angle of repose on the appropriately widely dimensioned conveyor belt, comes to a complete rest. When production begins, it is merely necessary to adjust the spacing between the endless conveyor belt and the outlet aperture of the sprinkling material container of the sprinkling material to be used. The quantity regulation of the material to be sprinkled on can also be effected by varying the travelling speed of the conveyor belt.

In order to ensure that the two outer edge zones of the web are always adequately covered with sprinkled material, the stream of material sprinkled must be wider than the web, more particularly if the web does not follow the prescribed course accurately. Therefore, some sprinkled material always falls down unused laterally of the web. According to a further feature of the invention it is proposed that this surplus material also shall be brought back again into the working process in the shortest way and in a simple fashion. For this purpose there are provided, laterally of the sprinkling zone, collecting devices for the sprinkled material which falls near the said zone. A conveying device at the same time collects the sprinkled material coming from the collecting device and returns said material again to the sprinkling material container. Wheels which have a trough-shaped cross-section peripherally and are sub-divided into individual segments, are expediently mounted one on each side of the conveyor belt. As the wheels rotate, the sprinkled material collects in the segments, is conveyed upwards and falls back over a guide plate onto the conveyor belt or back into the sprinkling material container. In this way no sprinkled material is lost, and surplus material is used again immediately in the same working process.

One example of embodiment of the subject of the invention is illustrated diagrammatically in the accompanying drawings in which:

Fig. 1 is a longitudinal sectional view taken on the line I—I of Fig. 2 of the sprinkling apparatus according to the invention; and Fig. 2 is a cross-sectional view taken on the line II—II of Fig. 1.

Two cylinders 3 and 4 for deflecting the direction of travel of the web of material 2 are arranged one above the other on axles 3ª and 4ª respectively in a frame 1, and are somewhat offset laterally so that the web 2 which is moved in the direction of the arrows 5 is made to travel in the reverse direction for a slight distance and at an inclination to the horizontal, above the first cylinder 3. The sprinkling apparatus consists of a sprinkling material container or hopper 6 and a conveyor belt 7 which is arranged below the said container and which travels in the direction of the arrow 10 about the rollers 8 and 9. The sprinkling material container 6 has an outlet slot 11 which is disposed in the horizontal plane and whose spacing from the upper surface of the conveyor belt 7 can be adjusted. The spacing between the conveyor belt 7 and the outlet slot 11 of the sprinkling material container 6 can advantageously be varied by directly lifting or lowering the container itself by means of one or more eccentrics 12 on which the container frame bears. A further possible method of regulating the quantity of material sprinkled can be to vary the speed of travel of the conveyor belt 7. Any sprinkled material which falls off the deflected web 2 and is situated on the cylinder 3 is guided by a stripper 13 back onto the conveyor belt 7.

The sprinkling material container 6 is advantageously given an outlet aperture 11 of such a length that the outer edge zones of the web 2 to be sprinkled are adequately dusted with sprinkling material. In order to make it possible to utilize sprinkled material which falls down laterally near the web 2, there is provided a conveying device which in the example of embodiment is constructed as a bladed wheel 14 at each side of the apparatus. The wheel 14 is constructed in trough-shaped manner at its periphery, the trough 15 being sub-divided by blades 16 or the like into a plurality of segments or compartments 17. The guide plates 18 suitably mounted in the frame 1 serve to collect any sprinkled material which falls down laterally of the web in the sprinkling zone. The guide plates 19 also supported on the frame 1 and which are arranged above the sprinkling material container 6 serve to convey back into the container 6 sprinkled material which has been gravitationally ejected from the compartments 17 of the upper sides of the wheels 14. The wheels 15 can be arranged on the same shaft 20 that carries the front guide roller 9 of the conveyor belt 7.

The apparatus according to the invention operates in the following manner:

Coming from a coating apparatus, where the web 2 is covered with an adhesive substance, the web 2 travels below the conveyor belt 7 over the guide cylinders 3 and 4. Sprinkling material from the container 6 is taken up by the rotating conveyor belt 7 and falls therefrom onto the upper side of the web 2. A proportion of the sprinkled material, covering the web completely, is entrained by the adhesive coating of the said web, while the surplus sprinkled material falls downwards when the web is made to change direction about the cylinders 3 and 4, as shown in Fig. 1. The non-adhering portion of the sprinkled material passes onto the outer surface of the cylinder 3 to the stripper 13, which removes said material from the cylinder and conveys it to the conveyor belt 7. The conveyor belt 7 guides this quantity of sprinkled material to below the sprinkling material container 6 and said quantity of sprinkled material is supplemented by further supply of the same material from the said container, and the conveyor belt discharges the material onto the upper side of the web 2.

The excess sprinkled material 21 which falls down to the right and left laterally of the web 2, when the upper side of the web 2 is being sprinkled, as shown in Fig. 2, is directed by the guide plates 18 which are situated at each side of the web, into the compartments 17 of the wheels 14, which raise the material collected in the compartments and discharge it, at the top of the rotary path of travel of said wheels onto the guide plates 19. The sprinkled material slides down these latter guide plates back into the container 6. It is also possible to have such an arrangement that the sprinkled material falling down on each side of the web is conveyed to one and the same wheel 14 by appropriate guiding of the guide plates.

It may happen that the web 2 may deviate laterally somewhat from the direction of movement. In order to make it possible for the outlet aperture of the container 6 to allow for such movement, the sprinkling material container 6 can be mounted in such manner as to be laterally displaceable.

What is claimed is:

1. Apparatus for sprinkling granular material on a continuously moving web and recovering excess material for reuse, said apparatus comprising a support frame, vertically disposed supply hopper means on said frame, means on said frame for supporting a continuous web in movement substantially horizontally beneath said hopper, discharge means supported on said frame beneath said hopper and above the path of travel of said web and receiving material from said hopper and depositing material transversely of the path of travel of said web and laterally over the side edges thereof, material elevating means receiving excess granular material laterally from said web and returning it to said hopper means, and web-inverting means spaced from said discharge means and receiving excess granular material dropping from said web as it is inverted and directing this excess material back to said discharge means.

2. The structure of claim 1; said discharge means comprising an endless belt conveyor in a horizontal plane and underlying said hopper and receiving material from said web-inverting means.

3. The structure of claim 2; and stripper means extending between said web-inverting means and said endless conveyor and directing excess material from said web-inverting means to said endless conveyor.

4. The structure of claim 1; said material elevating means comprising first conveyor means underlying said path of travel of said web and directing excess material laterally beneath said path of travel, second conveyor means overlying said hopper means and extending laterally and downwardly toward the hopper, and trough cross-sectioned conveyor wheel means mounted on an axis of rotation between said first and second conveyor means and having a radius greater than the distance from said axis of rotation to either of said conveyor means, said first and second conveyor means both extending laterally into said conveyor wheel means and said first conveyor means directing material into said wheel means, said second conveyor means receiving excess material from said conveyor wheel means, said conveyor wheel means including inwardly opening material receiving portions on the inner periphery thereof for carrying material along said wheel from said first conveyor means to said second conveyor means.

5. The structure of claim 4; said discharge means comprising an endless belt conveyor underlying said hopper and receiving material from said web-inverting means.

6. The structure of claim 5; said endless belt conveyor and said conveyor wheel means having a common axis of rotation.

References Cited in the file of this patent

UNITED STATES PATENTS

| | | |
|---|---|---|
| 366,186 | Richards | July 5, 1887 |
| 1,185,329 | Janisch | May 30, 1916 |
| 1,520,014 | Cumfer | Dec. 23, 1924 |
| 1,696,171 | Lipsius | Dec. 18, 1928 |
| 1,840,396 | Jones | Jan. 12, 1932 |
| 2,037,788 | Hultberg | Apr. 21, 1936 |
| 2,037,822 | Robert | Apr. 21, 1936 |
| 2,573,270 | Miller | Oct. 30, 1951 |
| 2,661,303 | Fasold et al. | Dec. 1, 1953 |
| 2,681,637 | Simpson | June 22, 1954 |
| 2,700,955 | Speed et al. | Feb. 1, 1955 |